United States Patent [19]
Willwerth et al.

[11] Patent Number: 6,035,991
[45] Date of Patent: *Mar. 14, 2000

[54] BLOCKED SLOT CLUTCH PLATE LINING

[75] Inventors: John Willwerth, Rochester Hills; Gregory J. Guitar, Roseville, both of Mich.

[73] Assignee: Advanced Friction Materials, Inc., Sterling Heights, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/764,123

[22] Filed: Dec. 11, 1996

[51] Int. Cl.$^7$ ...................................................... F16D 13/74
[52] U.S. Cl. .................. 192/107 R; 192/113.36
[58] Field of Search .............................. 192/70.12, 70.14, 192/113.36, 107 C, 107 R

[56] References Cited

U.S. PATENT DOCUMENTS

| | | |
|---|---|---|
| 1,936,240 | 11/1933 | Lane . |
| 2,097,710 | 11/1937 | Whitelaw et al. . |
| 2,430,936 | 11/1947 | Kraft . |
| 2,516,544 | 7/1950 | Breeze . |
| 2,690,248 | 9/1954 | McDowall . |
| 2,850,118 | 9/1958 | Byers . |
| 2,987,143 | 6/1961 | Culbertson et al. . |
| 3,081,842 | 3/1963 | Zindler et al. . |
| 3,425,524 | 2/1969 | Dewar . |
| 4,027,758 | 6/1977 | Gustavsson et al. . |
| 4,260,047 | 4/1981 | Nels ..................................... 192/70.14 |
| 4,396,100 | 8/1983 | Eltze . |
| 4,674,616 | 6/1987 | Mannino, Jr. . |
| 4,726,455 | 2/1988 | East . |
| 4,878,282 | 11/1989 | Bauer . |
| 4,986,397 | 1/1991 | Vierk ................................ 192/113.36 X |
| 4,995,500 | 2/1991 | Payvar . |
| 5,048,654 | 9/1991 | Yesnik . |
| 5,094,331 | 3/1992 | Fujimoto et al. . |
| 5,101,953 | 4/1992 | Payvar . |
| 5,134,005 | 7/1992 | Wada et al. . |
| 5,176,236 | 1/1993 | Ghidorzi et al. . |
| 5,332,075 | 7/1994 | Quigley et al. . |
| 5,335,765 | 8/1994 | Takakura et al. ............... 192/113.36 X |
| 5,439,087 | 8/1995 | Umezawa . |
| 5,566,802 | 10/1996 | Kirkwood . |

FOREIGN PATENT DOCUMENTS

| | | |
|---|---|---|
| 0625647 | 11/1994 | European Pat. Off. . |
| 2191658 | 2/1974 | France . |
| 2490756 | 3/1994 | France . |
| 2042289 | 3/1972 | Germany . |
| 1498813 | 1/1978 | United Kingdom . |
| 1604827 | 12/1981 | United Kingdom . |
| 2125125 | 2/1984 | United Kingdom . |

*Primary Examiner*—Rodney H. Bonck
*Attorney, Agent, or Firm*—Brooks & Kushman P.C.

[57] ABSTRACT

An automatic transmission clutch plate provides reduced drag in a wet clutch environment by employing independent offset slots through a friction lining applied to an annular clutch plate. The slots extend through the friction lining from at least one inner or outer peripheral edge of the ring to a terminating point between the radially inner and outer edges. In addition, slots through the friction lining extending from the radially inner edge are offset from the grooves extending through the lining from the radially outer edge. Preferably, the friction lining is formed by segments, and slots can be conveniently formed through the lining between radial edges spaced apart from each other on adjacent arcuate lining segments. In addition, the arcuate segments preferably include overlapping ends to form the offset slots.

9 Claims, 2 Drawing Sheets

U.S. Patent    Mar. 14, 2000    Sheet 1 of 2    6,035,991
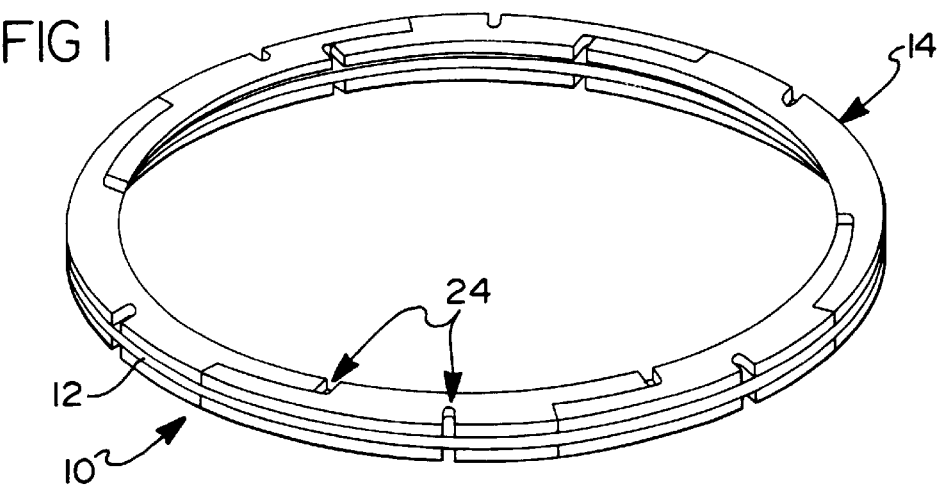
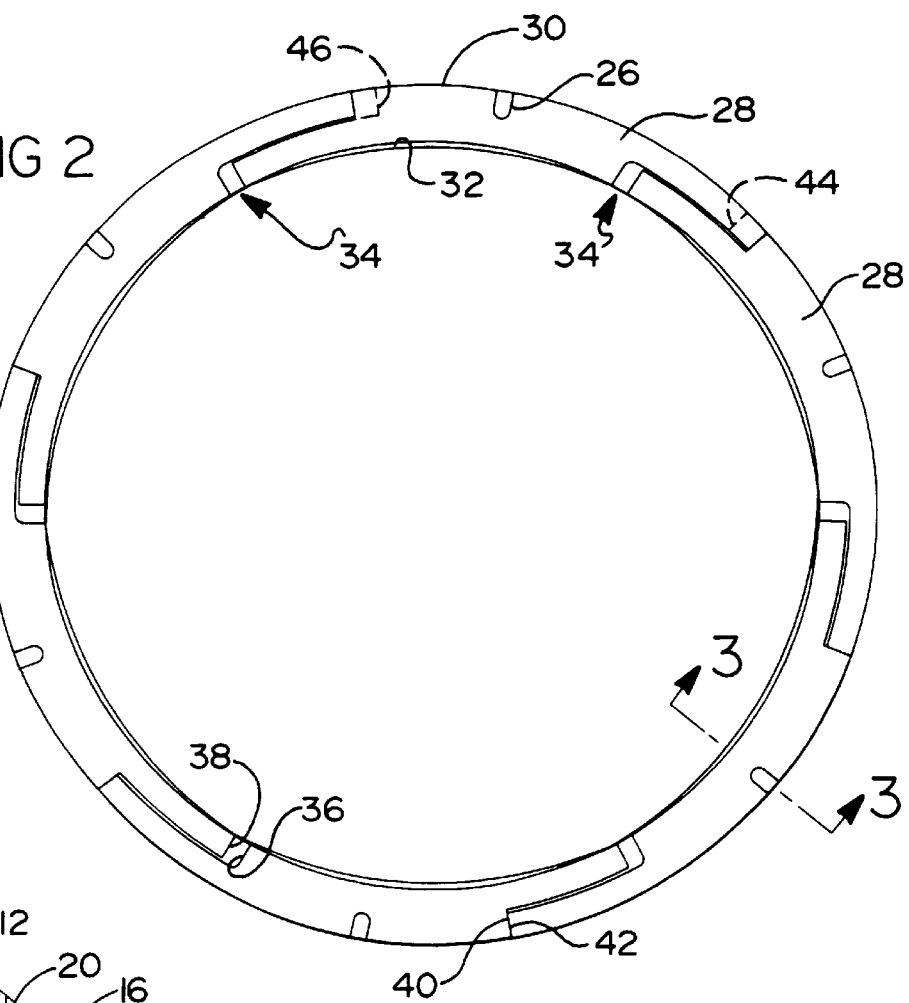
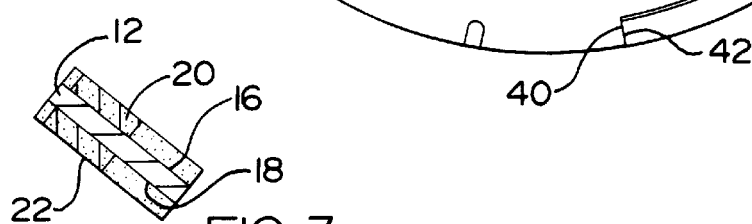

BLOCKED SLOT CLUTCH PLATE LINING

FIELD OF THE PRESENT INVENTION

The present invention relates to automatic transmission clutch plates including a friction lining with slots through the lining for reducing drag in the fluid environment when the clutch plates are disengaged.

BACKGROUND ART

Annular clutch plates used in fluid filled automatic transmissions are well known. A plurality of annular plates, each plate carrying at least one friction lining, are compressed together to transfer torque between independent members of the transmission. The torque transfer efficiency is improved by the lining, but improvements in the linings have been developed to address certain problems during engagement and release of the clutch plates with respect to each other.

One previously known type of wet multi-plate clutch includes a plurality of clutch plates, each plate having discrete separated segments of friction lining. The separations between the segments form oil passages from the radially inner edge to the radially outer edge of the clutch plate to permit the passage of fluid for lubrication and cooling. The segments also include oil retaining grooves that maintain an oil volume between mating friction linings to prevent sticking when the clutch plates are to be disengaged from each other.

Another known form of friction disc for use in multi-plate friction clutch packs includes annular core plate segmented with interlocking ends to form a ring. The ring includes friction facings which are also segmented and bonded to the core plate with facing segments overlapping the interlocking ends of the core plate segments. The ends of the friction facing segments may be interlocked or slightly spaced apart to form oil channels, while openings in the core pieces intersect circumferentially offset radial channels in the lining. The channels open only to either radially outer or radially inner edges of the friction segment so that the limited channels are coupled by core openings that pass through the disc.

Another known clutch disc includes molded annular clutch facing having a plurality of surface grooves molded into the facing. The grooves extend not substantially more than halfway across the annulus, and each groove is not greater than forty percent of the thickness of the facing in depth. The grooving improves torque capacity and hill start capability, provides reduced propensity for judder, improves take-up characteristics, and resists ringing-on, the phenomena that involves a facing adhering to a mating clutch plate surface and preventing the clutch from becoming disengaged.

Another improvement to disengage clutch plates includes a facing with a plurality of grooves that provide non-rectangular transitional areas together with grooves that provide rectangular transitional areas interposed therebetween.

While none of the above improvements are particularly concerned with the problem of reducing drag in a fluid environment, U.S. Pat. No. 5,134,005 provides a ring that has a plurality of fluid reservoirs in a groove extending between the reservoir and the outer periphery of the ring. In the patented structure, the area of the reservoir and the grooves is between five percent to ten percent of the total frictional surface area of the ring to reduce drag. However, as with other previously known clutch facing modifications, the formation of particularly configured grooves can substantially increase the cost of assembling and fabricating the components of the clutch plate.

SUMMARY OF THE PRESENT INVENTION

The present invention overcomes the above-mentioned disadvantages by providing an automatic transmission clutch plate in which an annular plate substrate carries a friction lining including a plurality of independent offset slots through the lining that are blocked from communication with slots at the opposite edge to reduce drag in the fluid environment. The clutch plate linings do not require the complex lining configurations required in the prior art to reduce drag in a fluid environment or to reduce the resistance to disengagement of the plates. In addition, the slots are formed to resist fluid flow through or across the plates that can increase turbulence when the clutch plates are disengaged.

In the preferred embodiment, the friction lining is applied in a plurality of segments. Preferably, the segments are arcuately shaped so that they can be circumferentially positioned adjacent to each other on the clutch plate substrate faces. Accordingly, at least some of the slots may be formed by radial edges of adjacent arcuate segments. In addition, at least one of the segments may include a circumferentially overlapping portion that blocks the slot through the lining from one of the radially inner or radially outer edges of the plate.

As a result, the present invention provides a clutch plate lining that effectively reduces drag in the fluid environment without complicating the construction of or the configuration of slots formed in the facing. In addition, the present invention provides clutch plate linings formed of a plurality of segments that are substantially easier to fabricate and assemble to annular clutch plates than previously known clutch plate linings. Moreover, the present invention provides a process for reducing drag during disengaged rotation of clutch plates in an automatic transmission by simply fabricating friction lining pieces. In addition, the present invention blocks fluid communication across engaged plates or through disengaged clutch plates as when the annular clutch plate substrate includes a bore across the axial width of a lined clutch plate.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which:

FIG. 1 is a perspective view of a lined clutch plate constructed according to the present invention;

FIG. 2 is a front view of a lined clutch plate constructed according to the present invention;

FIG. 3 is a sectional view taken substantially along the lines 3—3 in FIG. 2;

DETAILED DESCRIPTION OF THE PREFERRED EMBODIMENT

Figure 4:
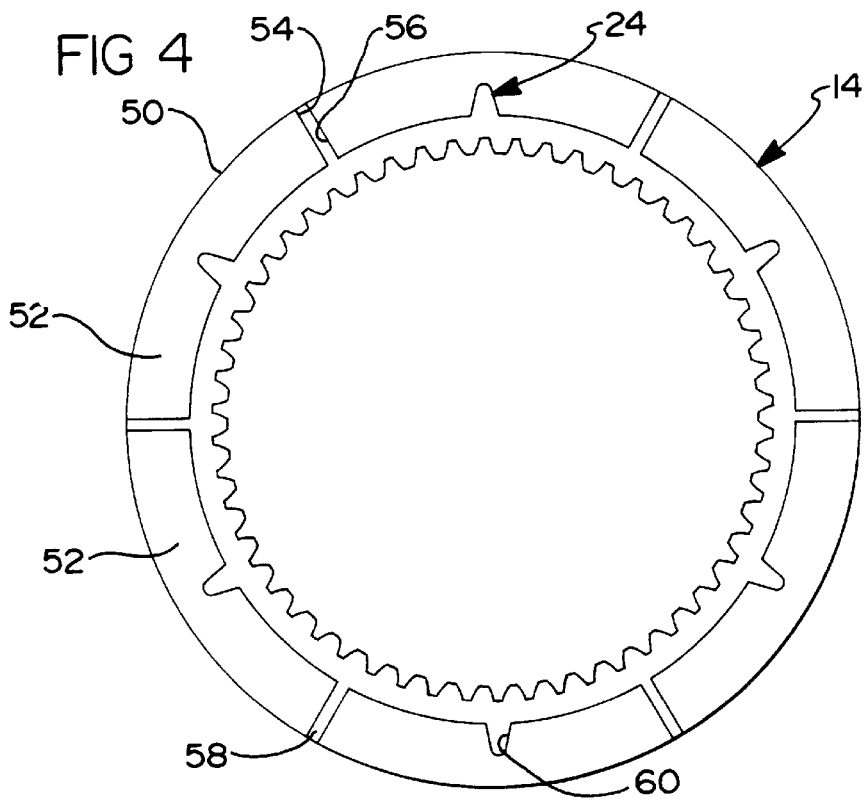
FIG. 4 is a front view of a lined clutch plate similar to FIG. 2 but showing a modified combination of lining features according to the present invention.

Referring first to FIG. 1, a clutch plate 10 includes an annular plate substrate 12 carrying a friction lining 14. The lining 14 may be applied to one or both faces 16 and 18 of the plate ring 12, although it is shown attached to both sides in the preferred embodiment. Preferably, each layer 20 and 22 preferably includes the independent offset slots 24 through the lining. Generally, an assembly of multiple friction clutch plates, preferably interspersed with unlined separator plates, is carried in a fluid environment in an automatic transmission and the plates are subjected to selective engagement against adjacent plates for torque transfer between independent rotary members in a well known manner.

Referring now to FIG. 2, the preferred embodiment shows slots 26 formed by material removed from a segment 28 of friction lining material. Each of the segments 28 has a generally arcuate shape, and a plurality of segments 28 are circumferentially positioned adjacent to each other to substantially cover face 16 or 18 of the plate ring 12. Although each of the slots 26 is shown to extend from a radial outer edge 30 of the ring 10, the slots may also be formed to extend from the radially inner edge 32. In either event, the slot 26 terminates short of the other of the radially inner and radially outer edge from which it extends so that it does not provide a complete fluid communication path between the radially inner edge 32 and the radially outer edge 30.

As also shown in FIG. 2, slots 24 may also be formed in the manner of a slot configuration 34 in which edges 36 and 38 of lining segments are spaced apart to form the slot 34. Although the slots 34 are shown to extend radially from the radially inner edge 32 to a point that terminates near the middle of the face of ring 12 and short of the outer radial edge 30, such slots 34 can also be positioned at the radially outer edge 30 of the lining layer. For example, an additional spacing could be provided between the edges 40 and 42 shown in FIG. 2 either by shortening the lining portion carrying edge 40 as shown at 44 or shortening adjacent lining segment border carrying edge 42 as shown at 46.

Regardless of whether the slots 24 are aligned at opposite faces as shown at 24 in FIG. 1 and as shown in FIG. 3, or whether they are offset from slots on opposite faces, fluid communication through the lining and the substrate is blocked between the radially inner edge 32 and the radial outer edge 30 of the ring 10. Thus while promoting heat transfer to the fluid in each slot and lubrication to the mating lining surfaces during engagement of adjacent rings 10 as is well known in the operation of automatic transmissions, the slots 24 provided reduced drag over previously known ring plate constructions when the rings are disengaged from each other. It is believed that the inboard blocked grooves reduce drag by resisting the centrifugal force of fluid urged radially outward from the plate. This resistance creates an inboard pressure head that redirects forces to equalize separation between the plates in the series of plates in the clutch assembly. The outboard radially outer blocked grooves serve as wipers where the inboard blocked grooves are shorter than the radial dimension of the annular face.

Referring now to FIG. 4, a modified form 50 of lining 14 is shown comprising separated segments 52. Peripheral edges 54 and 56 of adjacent segments 52 are separated to provide an oil passage across the disk from the radially inner edge to the radially outer edge of the disk. These passages 58 can be radially aligned as shown, or otherwise aligned or configured to adjust fluid flow through the passage 58. A tapered, blocked groove 60 forms each of a plurality of radially inner, blocked grooves 26 in this modified embodiment. Similarly, tapered, blocked grooves opening to the outer radial edge of the ring 10 can be employed. The passages 58 are particularly useful in clutch assemblies that often freewheel, for example, transfer cases of sport utility vehicles driven mostly on the road, to reduce drag loss.

Figure 5:
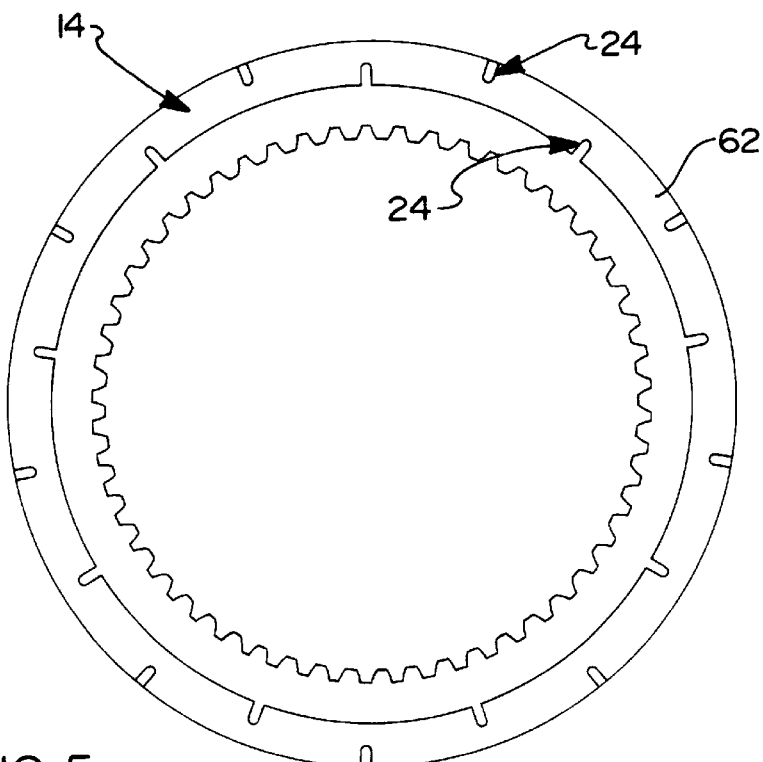
FIG. 5 is a front view of a lined clutch plate similar to FIGS. 2 and 4 but showing a further modified combination of lining features according to the present invention.

As shown in FIG. 5, a lining 14 may be made in one continuous annular ring 62. A singular lining includes alternating, offset blocked grooves 24 at both the inner and outer radial edges of the ring 62. A substantially larger number of blocked grooves 24 are provided in the lining 14 where the lining does not provide oil passages, such as 58 shown in FIG. 4, that permit the passage of oil completely across the face of the clutch plate even when it is engaged against an adjacent plate.

As a result, the present invention reduces energy losses in the transmission without sacrificing the efficiency of engagement or disengagement of the clutch plates, and substantially reduces the load upon the drive train when the clutch plates are disengaged. In addition, the present invention provides a process for reducing drag by employing slots through the friction lining that is blocked from fluid communication with other slots through the lining. In addition, the present invention provides efficiency in applying friction material to clutch plate rings by segmenting and spacing clutch plate segments as desired to incorporate independent offset slots according to the present invention.

Having thus described the present invention, many modifications thereto will become apparent to the skilled in the ar to which it pertains without departing from the scope and spirit of the present invention as defined in the appended claims.

What is claimed is:

1. An automatic transmission clutch plate comprising:
    an annular substrate having front and rear faces; and
    a friction lining applied to at least one said face of said annular substrate, said friction lining comprising a plurality of independent offset slots through the lining at the radially inner and the radially outer edges of the lining and blocked from fluid communication across the clutch plate or through the substrate.

2. The invention as defined in claim 1 wherein said friction lining comprises a plurality of arcuate segments.

3. The invention as defined in claim 2 wherein at least one of said slots comprises spaced radial edges of adjacent annular segments.

4. An automatic transmission clutch plate with reduced drag during disengagement in a fluid, comprising:
    an annular substrate having opposed facing surfaces;
    a friction lining comprising a plurality of segments, said segments defining a plurality of slots through the friction lining, at least one first segment forming at least one first slot extending across the substrate from only one of either a radially inner edge and a radially outer edge, and at least one segment forming at least one second slot, and said substrate blocking fluid communication between each said first slot and said second slot.

5. A process for reducing the drag of disengaged automatic transmission clutch plates in a fluid medium comprising:
    providing an annular substrate having first and second sides;
    providing a friction lining on at least one of said first and second sides; and
    positioning independent slots through said lining so that each slot extends only from one of either a radially inner edge and a radially outer edge, and each slot extending from said radially inner edge is offset from the adjacent slot extending from said radially outer edge by a blocking lining segment portion and by said annular substrate.

6. The invention as defined in claim 5 wherein said providing a friction lining comprises applying a plurality of arcuate segments along said at least one of said first and second sides.

7. The invention as defined in claim 6 wherein said positioning step includes spacing a radial edge of a first of said plurality of segments from a radial edge of an adjacent segment of said plurality of segments.

8. An automatic transmission clutch plate comprising:

an annular plate substrate having front and rear faces;

a friction lining applied to at least one said face of said annular plate, said friction lining comprising a plurality of independent offset slots through the lining at the radially inner and the radially outer edges of the lining and blocked from fluid communication through the clutch substrate or across the plate;

wherein said friction lining comprises a plurality of arcuate segments;

wherein at least one of said slots comprises spaced radial edges of adjacent annular segments; and wherein said adjacent annular segments include overlapping ends.

9. A process for reducing the drag of disengaged automatic transmission clutch plates in a fluid medium comprising:

providing an annular plate having first and second sides;

providing a friction lining on at least one of said first and second sides;

positioning independent slots through said lining so that each slot extends only from one of either a radially inner edge and a radially outer edge, and each slot extending from said radially inner edge is offset from the adjacent slot extending from said radially outer edge by a blocking lining segment portion;

wherein said providing a friction lining comprises applying a plurality of arcuate segments along said at least one of said first and second sides;

wherein said positioning step includes spacing a radial edge of a first of said plurality of segments from a radial edge of an adjacent segment of said plurality of segments; and wherein at least one of said first segment and said adjacent segment have a circumferentially overlapping portion.

* * * * *

UNITED STATES PATENT AND TRADEMARK OFFICE
CERTIFICATE OF CORRECTION

PATENT NO : 6,035,991
DATED : March 14, 2000
INVENTOR(S) : WILLWERTH, et al.

It is certified that error appears in the above-identified patent and that said Letters Patent is hereby corrected as shown below:

Column 4, Line 37, Claim 1: delete "across and insert --through--.

Column 4, Line 38, Claim 1: delete "through" and insert --across--.

Column 5, Line 13, Claim 8: after "annular" delete "plate".

Column 5, Line 19, Claim 8: delete "substrate" and insert --plate--; and delete "plate" and insert --substrate--.

Signed and Sealed this

Sixth Day of March, 2001

Attest:

NICHOLAS P. GODICI

Attesting Officer

Acting Director of the United States Patent and Trademark Office